Patented Nov. 27, 1934

1,981,986

UNITED STATES PATENT OFFICE 1,981,986

PROCESS FOR MANUFACTURING CHEDDAR CHEESE

Linda C. Bruhn, Auburndale, Wis.

No Drawing. Application April 28, 1930, Serial No. 448,176

3 Claims. (Cl. 99—11)

My invention relates to improvements in processes for manufacturing cheddar cheese.

The primary object of my invention is to provide means for manufacturing a cheddar cheese in small packages which can be kept without developing a rind and without molding or other deterioration for sufficient periods of time to enable the same to be transported, stored, and marketed without requiring sterilization or pasteurization and with the characteristic flavor and aging quality of cheddar cheese unimpaired.

In the manufacture of my improved cheese the ordinary process followed in the manufacture of cheddar cheese is employed until the curd is ready to be placed in the press. Before placing the curd in the press it is divided into five pound loaves and placed in metal molds, whereupon it is transferred to the press and subjected to pressure of two thousand pounds to the square inch.

Thereupon, the cheese is removed from the press and also removed from the molds. The loaves are then placed in the curing room where they are covered with special wrappers or covering cloth such as is ordinarily employed for wrapping cheese. It is kept in the curing room for about four hours to partially dry the surfaces. In handling these cheese loaves, care should be taken not to cut or break the surface of the pressed cheese, it being very desirable that the loaves should have a smooth unbroken surface.

After curing, as above stated, the loaves are then dipped in water having a temperature of approximately 195° F. each loaf being preferably dipped about three or four times into this heated liquid. Dippers may be employed to support a plurality of loaves, preferably about a dozen, and the bottoms of the dippers should be composed of slats with cheese supporting edges, whereby the water may be brought into contact with substantially the entire surface of each loaf. The heated water kills any mold germs that may be present and melts the butter fat on the surface of the loaf sufficiently to seal the pores and cover the loaf with a thin skin or shiny coating of substantially pure fat.

By submerging the loaves in the water and then instantly removing them and repeating the operation successively about three or four times it is possible to obtain this butter fat seal without materially heating the body of the cheese.

Immediately after this dipping treatment, the loaves are submerged in cold water to which has been added about a pound of saleratus, sodium bicarbonate, to twelve gallons of water. The cold water treatment chills the butter fat and completes the formation of the impervious skin and the alkaline treatment, due to the presence of the saleratus in solution, brings about a glossy finish.

Thereupon, each loaf is thoroughly surface dried, preferably by a hot air blast, to remove all water bubbles and bring the loaf to a condition where it can be wrapped in foil, preferably tinfoil, and the tinfoil made to adhere to the surface, the foil being applied while the surface of the cheese is still warm and the butter fat coating is sufficiently softened by the air blast to permit the tinfoil to adhere in sealing relation thereto.

After the loaves have been wrapped in tinfoil they are covered with cloth or parchment paper to prevent injury to the tinfoil covering and returned to the molds, whereupon they are placed in a drying oven for about ten minutes during which period the cheese is subjected to a temperature of 400° to 450° F. the time during which the cheese is kept in the drying oven being dependent to some extent upon the temperature.

Thereupon, the molds are removed from the oven and returned to the cheese press, covered with a suitable blanket, and subjected to a pressure of approximately two thousand pounds (2,000) to the square inch for about twelve hours. When the cheese filled molds are thus placed in the press the surfaces of the loaves are still warm enough so that when subjected to heavy pressure the foil covering is pressed into the softened butter fat coating, thereby completing the sealing operation. The pressure should be applied gradually, whereby to avoid rupturing the foil and allow the cheese to conform to the contour of the mold.

Thereupon, the cheese is removed from the molds and preferably placed in the curing room where it is allowed to remain for one or two days until thoroughly cooled, after which it is packaged for transportation or commercial sale. It is preferably wrapped, placed in cartons and then packaged in wooden boxes for transportation and commercial sale. The object of wrapping the tinfoil covered loaves and then placing them in cartons before packaging in wooden boxes is to prevent the tinfoil from becoming broken and thus destroying the seal.

In the foregoing description I have referred to the use of tinfoil as the sealing material to be applied directly to the butter fat seal but it will be understood that any other impervious covering having the sealing characteristics of tinfoil and which is otherwise suitable to be applied directly to the surface of a food product, such as cheese, may be employed. The term "foil" as herein used is defined as being intended to designate any such impervious material.

Care should be exercised to obtain unbroken or imperforate foil in sheets of proper size, whereby the entire surface of the cheese may be completely covered and protected. Care should also be taken to apply pressure to the foil covered loaves in such a manner as to bring the foil into continuous adhesive contact with the loaf surfaces throughout the area thereof. It will, of course, be also understood that the milk employed in manufacturing the cheese must be pure and of good quality.

I claim:

1. The process of manufacturing cheese from cheddar curd, consisting in compressing the curd into loaf form and expelling the whey, surface drying the loaves, dipping them momentarily and repeatedly in water having a sufficiently high temperature to melt the surface butter fat, submerging the loaves in a cold alkaline solution, surface drying the loaves, wrapping the same in foil and then subjecting the loaves for about ten minutes to a temperature of approximately 400° to 450° F. and compressing the foil into the butter fat to form a continuous impervious covering for the loaf.

2. The process of manufacturing cheddar cheese in small loaves directly from curd, which consists in forming the curd into uncured loaves while expelling the whey therefrom and applying sufficient pressure to provide the loaves with smooth unbroken surfaces free from pits and mold fostering depressions, dipping the loaves momentarily and repeatedly in hot liquid to melt exposed surface butter fat and develop superposed film coatings thereof over the loaf surfaces while avoiding material heating of the body of the cheese, and producing an unbroken covering of substantially pure fat for the loaf, surface drying and packaging the loaves in sealing wrappings, compressing the wrappings upon the loaves and subsequently curing them to a desired degree.

3. The process of manufacturing cheese in small loaves directly from curd, consisting in molding and compressing portions of the curd into loaves of a desired size while simultaneously expelling the whey and eliminating surface irregularities to provide the loaves with smooth unbroken surfaces, dipping the loaves in heated water to destroy mold germs and melt exposed butter fat, then dipping the loaves in an alkaline chilling solution, subjecting them to a surface drying air blast, wrapping them in unbroken metallic foil, enclosing them in a foil protecting covering and subjecting them to heavy pressure and heat sufficient to cause the foil to adhere to said coating while supporting the loaves in the form in which they were originally molded, and curing them to a desired degree.

LINDA C. BRUHN.